Figure 1:
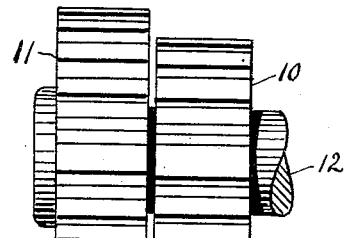

J. H. MALLEY.
GEARING.
APPLICATION FILED APR. 29, 1909.

977,207.

Patented Nov. 29, 1910.

2 SHEETS—SHEET 1.

WITNESSES
Ada E. Fagerty
Elsa B. Dana

INVENTOR.
John H. Malley
BY
Joseph H. Miller
ATTORNEY.

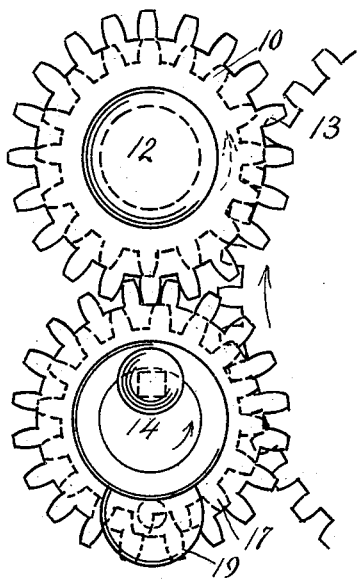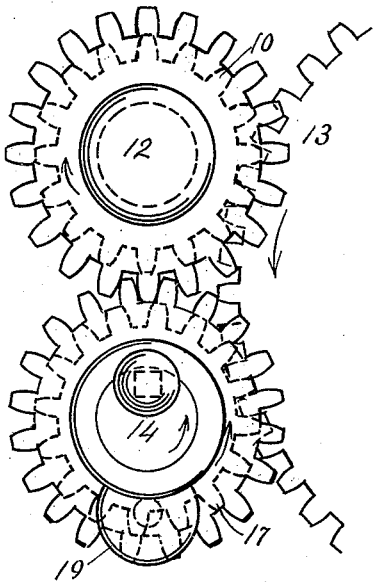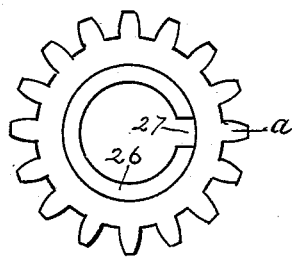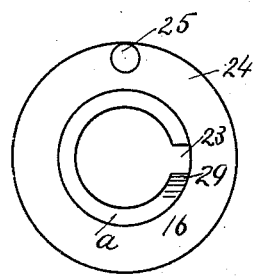

UNITED STATES PATENT OFFICE.

JOHN H. MALLEY, OF HARRISVILLE, RHODE ISLAND.

GEARING.

977,207.  Specification of Letters Patent.  Patented Nov. 29, 1910.

Application filed April 29, 1909. Serial No. 492,814.

*To all whom it may concern:*

Be it known that I, JOHN H. MALLEY, a citizen of the United States, residing at Harrisville, in the county of Providence and State of Rhode Island, have invented a new and useful Improvement in Gearing, of which the following is a specification.

This invention has reference to an improvement in pattern looms and more particularly to the head motion of looms carrying the pattern chain.

The object of the invention is to more positively operate the change mechanism of the change gears of the chain driving mechanism.

A further object of the invention is to release the change gears from the driving shaft.

A still further object is to so construct the change gear as to increase the utility of the same.

My invention consists in the peculiar and novel construction of the change gears and locking device, whereby the gears are driven in one direction or reversed, or entirely released from the driving shaft, as will be set forth hereinafter and pointed out in the claims.

Referring to the drawings, like numerals of reference designate like parts throughout the several views.

Figure 3:
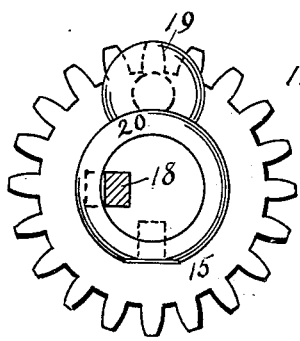
Figure 4:
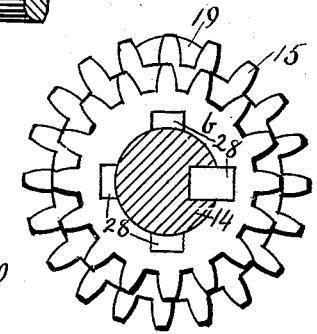
Figure 2:
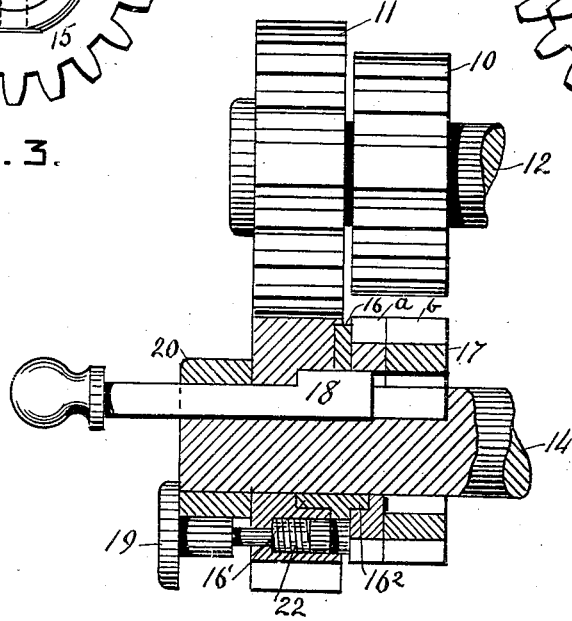

Figure 1 is a view, partly in section, of the change gears embodying my improvements. Fig. 2 is a view, partly in section, particularly showing the connecting key and latch. Fig. 3 is a front view of the change gears, showing the head of the latch and the neck of the key which is in section. Fig. 4 is a back view of the change gears. Fig. 5 is a diametric view of the change gears and a part of the cylinder gear to indicate direction of revolution. Fig. 6 is a diametric view of the change gears and a part of the cylinder gear to indicate direction of revolution. Fig. 7 is a view of one of the rear change gears, and Fig. 8 is a side view of the flanged collar.

Referring to the drawings 10 indicates the inner one of the two connected transmission gears which normally run idle, the outer one being designated as 11. These two gears are either formed of one piece of metal or are secured together to form a compound gear and are mounted on the stud 12 which extends outward from the frame. The gear 10 is of smaller diameter than the gear 11. The cylinder gear 13 connects with and drives the gear 10 in the ordinary running of the loom. The shaft 14, usually the lower cylinder shaft, is driven always in one direction by the head motion in the usual and ordinary manner, and is the driving shaft of the gear system herein disclosed.

The change gear mechanism is supported on the shaft 14 and consists of the outer gear 15, the flanged collar 16, the inner gear 17 formed in two parts $a$ and $b$, the key 18 and the latch 19, all the parts being held in position on the shaft 14 by the collar 20.

The gear 15 is formed with the circular depression 21 into which the part 16' of the collar 16 extends and with the hole 22 in which the latch is carried. The collar 16 is formed with the keyway 23 and the outwardly-extending circular flange 24 in which is formed the hole 25 (one of the edges is cut away, as at 29, so that as the collar revolves the key will be held in position) as shown in Fig. 8 of the drawings.

The compound gear 17 is formed in two parts $a$ and $b$, the part $a$ being formed with the depression 26 for receiving the part $16^2$ of the collar 16 and has the keyway 27, as shown in Fig. 7 of the drawings, the part $b$ being formed with four keyways 28 28, as shown in Fig. 4 of the drawings.

It will be readily seen that by this construction, when one of the keyways becomes worn the part $b$ can be removed from the shaft 14 and replaced in position to bring a new keyway in position for the key to enter, thereby practically giving to the gear 17 four times the life.

Only the part $b$ is made with four key ways, since if the gear were integral and provided with four key ways, it would be impractical to properly time the gears in connection with the operation of the chain driving mechanism. By having but one key way in the part $a$, it is assured that the timing will be properly effected and at the same time the relative position of the part $b$ may be changed as desired, in order to bring a new key way into use.

In the normal operation of the head motion of the loom, referring to Fig. 1 wherein the key 18 connects the shaft 14 and the gear 17, the cylinder gear 13 is driven by the gear 17 (in the direction of the arrow, Fig. 5) and the gears 10 and 11 run idle, the latter driving the gear 15 which runs idle in a reverse direction to the gear 17.

When it is desired to reverse the rotation of the gear 13, the key 18 is pulled outwardly to the position shown in dotted lines in Fig. 1 and in full lines in Fig. 2. In this position, the heel or locking portion of the key engages partially in the recess 21 and partially in the key-way 23, thus coupling the shaft 14 and the collar 16. The latter is in turn coupled to the gear 15 by the latch 19 which occupies the full line position of Fig. 1. The gear 15 thus turns in the same direction as the shaft 14, driving the gears 11 and 10, and the latter driving the cylinder gear 13 in a reverse direction (Fig. 6) from that in which it was driven in the operation above described. The gear 13 in turn drives the gear 17, which now runs idle in a direction reverse to the shaft 14 and the gear 15.

When it is desired to completely release the change gear mechanism from the head motion of the loom for the purpose of changing the chains in any manner, as under this condition the loom would be stopped, the key is first drawn out thereby uncoupling the shaft 14 and gear 17 and then the latch 19 is drawn out from the locked position with the collar 16, as is shown in Fig. 2 of the drawings, thereby uncoupling the collar 16 and the gear 15. In this position the change gear mechanism is released from the shaft 14 and connecting parts of the head motion, the gear wheels being stationary, the collar 16 turning idly with the shaft 14, and the heel of the key 18 running freely in the recess 21 of the gear 15.

Having thus described my invention, I claim as new and desire to secure by Letters Patent;—

1. In a device of the nature described, the combination with a driven shaft, a gear rotatably supported on the shaft, a flanged collar surrounding the shaft, a compound gear surrounding the shaft, means for locking the compound gear to the shaft and operable also to disengage the compound gear and to lock the collar to the shaft, and means for locking the collar to the first named gear.

2. In a change gear mechanism for looms, the combination with a driven shaft, of a gear rotatably supported on the shaft, a collar surrounding the shaft, means for locking the collar to the gear, means for locking the collar to the shaft, and a compound gear surrounding the shaft, the last named means being operable to disengage the collar and to lock the compound gear to the shaft.

3. In a device of the nature described, the combination with a driven shaft, a gear rotatably supported on the shaft, a flanged collar surrounding the driven shaft, a compound gear surrounding the driven shaft, and a stepped gear connecting the gear with the compound gear, of means for connecting or disconnecting the first named gear to the flange of the collar, and means for connecting or disconnecting the collar and the compound gear to the shaft.

4. In a device of the nature described, the combination with a driven shaft, a gear assembled thereon, a flanged collar assembled thereon, a compound gear assembled thereon, and a stepped gear connecting the first named gear with the compound gear, of a latch to connect the collar and the first named gear, and means for connecting or disconnecting the compound gear and the collar to the driven shaft.

5. In a device of the nature described, a driven shaft, a pair of gears, and an intermediate element, means for coupling the intermediate element and one of the gears and means for putting the intermediate element into driven relation with the shaft when said element is coupled to said gear and for putting the other gear in driven relation with the shaft when said element is uncoupled from said gear.

6. In a device of the character described, a driven shaft, a pair of gears and an intermediate element assembled thereon, a latch to couple the intermediate element to one of the gears and a key to couple in alternation the intermediate element and the other gear to the shaft.

In testimony whereof I have signed my name to this specification in the presence of two subscribing witnesses.

JOHN H. MALLEY.

Witnesses:
 ADA E. HAGERTY,
 J. A. MILLER.